United States Patent [19]

Davis et al.

[11] 4,184,189

[45] Jan. 15, 1980

[54] CAPACITIVE PRESSURE SENSOR AND METHOD OF MAKING IT

[75] Inventors: Earl K. Davis, Tempe; Kent W. Hansen, Scottsdale; Scot W. Taylor, Tempe; Robert M. Wentworth, Phoenix, all of Ariz.

[73] Assignee: Motorola, Inc., Schaumberg, Ill.

[21] Appl. No.: 933,318

[22] Filed: Aug. 14, 1978

[51] Int. Cl.² ............................................. C03B 23/20
[52] U.S. Cl. ...................................... 361/283; 65/42; 65/43; 65/59 A; 73/718
[58] Field of Search .......................... 65/42, 43, 59 A; 73/718; 361/283

[56] References Cited

U.S. PATENT DOCUMENTS

| | | | |
|---|---|---|---|
| 3,195,028 | 7/1965 | Werner et al. | 73/718 X |
| 3,367,760 | 2/1968 | Bendig et al. | 65/59 A X |
| 3,778,242 | 12/1973 | Francel et al. | 65/43 |
| 3,907,535 | 9/1975 | Muller | 65/43 X |

*Primary Examiner*—Arthur D. Kellogg
*Attorney, Agent, or Firm*—John A. Fisher

[57] ABSTRACT

An inexpensive glass capacitive pressure sensor. Conductive capacitor electrodes are disposed on two flat glass plates, one serving as a diaphragm, the other as a substrate. The electrodes are positioned in a spaced apart, substantially parallel relationship to form the plates of a parallel plate capacitor. The glass plates are sealed together with a sealing glass mixture to bound a volume between the conductors. The volume is at a reference pressure, preferably a substantial vacuum. Differences between the pressure to be measured and this reference pressure cause a flexing of the glass diaphragm which is detected by measuring the capacitance between the two electrodes. A suitable sealing glass mixture which provides a hermetic seal between the glass plates is comprised of, in weight percent, 8-10 $SiO_2$, 1-2 $Al_2O_3$, 55-60 PbO, 7-9 $PbF_2$, 7-10 ZnO, 4-6 CdO, and 10-15 $B_2O_3$. The sealing glass mixture must be vacuum fined to permit hermetic sealing within a vacuum.

13 Claims, 2 Drawing Figures

CAPACITIVE PRESSURE SENSOR AND METHOD OF MAKING IT

BACKGROUND OF THE INVENTION

This invention relates to a capacitive pressure sensor, and more particularly, to an inexpensive glass capacitive pressure sensor.

Capacitive pressure sensors work on the principle that the plates of a parallel plate capacitor form two walls of an enclosure which bounds a volume whose pressure is some reference pressure. Changes in the ambient pressure in relation to the reference pressure cause a flexing of at least one of the capacitor plates. Such a flexing changes the spacing between the capacitor plates and thus the capacitance measured between them. Thus, measuring the capacitance provides a measure of the ambient pressure with respect to the reference pressure. One such capacitive pressure sensor was disclosed in a related application entitled "Method for Fabricating A Vacuum Pressure Transducer" Ser. No. 835,372, by Earl K. Davis et al and assigned to the assignee of the present application. To obtain a large and measurable capacitance change for a given change in pressure the capacitor plate must be flexible enough to deform appreciably as the pressure changes. This can occasion difficulties with over pressures or large pressure changes since such a flexible diaphragm is easily susceptible to damage from large deflections. Alternatively, the capacitor plates can be closely spaced so that any deflection of the diaphragm represents a large percentage change in the capacitor plate spacing. Close spacings of the capacitor plates requires that the plates themselves be very flat across their entire dimension. One capacitive pressure sensor is disclosed in U.S. Pat. No. 2,999,385. That sensor, however, requires, among other things, the complex shaping of two glass plates. The above referenced application provides a large measure of improvement over this previous pressure sensor, but still requires the polishing of expensive capacitor plates and further requires a two step sealing process.

Accordingly, in view of the deficiencies of the prior art, it is an object of this invention to provide a sensitive, inexpensive, glass pressure sensor.

It is a further object of this invention to provide a sealing glass and a method of sealing together in one operation a capacitive pressure sensor.

BRIEF SUMMARY OF THE INVENTION

These and further objects and advantages may be attained through use of the novel pressure sensor and method herein disclosed. Briefly stated, the pressure sensor is comprised of two flat glass plates having conductive electrodes disposed on their surfaces. The electrodes are positioned in a spaced apart, substantially parallel relationship to provide the two plates of a parallel plate capacitor. A sealing glass mixture is applied to at least one of the glass plates to form a perimeter seal. The space between the plates is then evacuated to a reference pressure and the plates are heated to a temperature sufficient to cause the sealing glass to flow and seal together the two plates. The two plates and the sealing glass then bound a volume within which the pressure is the desired reference pressure. The sealing glass, which must be compatible with the glass plates, is a mixture which comprises, in weight percent, 8–10 $SiO_2$, 1–2 $Al_2O_3$, 55–60 PbO, 7–9 $PbF_2$, 7–10 ZnO, 4–6 CdO, and 10–15 $B_2O_3$. To provide a hermetic seal under these vacuum sealing conditions, the sealing glass mixture must be vacuum fined before fritting.

BRIEF DESCRIPTION OF THE DRAWINGS

The invention can be better understood from a consideration of the following detailed description taken in connection with the drawings in which.

DETAILED DESCRIPTION OF THE INVENTION

Figure 1:
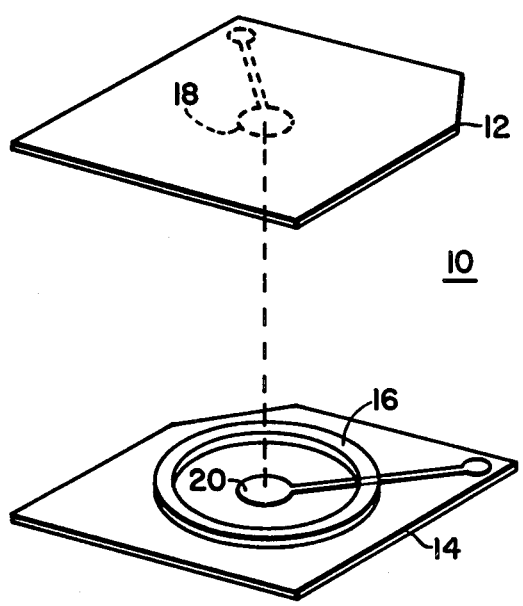
FIG. 1 is an exploded perspective view of a pressure sensor.

In one embodiment of the invention the geometry of the sensor is illustrated in FIG. 1. The sensor device 10 is comprised of two glass plates 12, 14 sealed together by a sealing glass ring 16. One of the plates 12 is thinner than the other 14 and acts as a diaphragm such that it can be deflected with the application of pressure. Conductive electrodes 18, 20 are applied to the inner surfaces of the two glass plates 12, 14 respectively. The glass plates are sealed together so that the glass plates and the sealing glass ring bound a volume of space. The pressure within this volume is established at some reference pressure. While the reference pressure could be any pressure, it is typical and preferable to select a substantial vacuum (say, less than about 100 mm Hg) as the reference pressure. For reasons of temperature compensation, it may be desirable to select the reference pressure to be about 20 to 50 mm Hg. For most glasses this reference pressure will change with temperature to compensate for the temperature change in Young's modulus of the glass. To obtain a reference pressure of 40 mm Hg at room temperature requires that the pressure at the glass sealing temperature be about 100 mm Hg. In operation, the capacitance between the two substantially parallel conductive electrodes is measured. As the ambient pressure changes the diaphragm flexes changing the spacing between the electrodes and thus changing the capacitance measured. The absolute value of the capacitance is a function of the size of the capacitor electrodes and the spacing between the electrodes. The sensitivity of the sensor is determined by the percentage change in capacitor plate spacing in response to a given pressure change. By closely spacing the two glass plates, even a small deflection of the diaphragm represents a large percentage change in the spacing and results in a large, easily measurable capacitance change.

The sensor device 10 can be fabricated from a variety of types of glass sheets. The most important considerations are flatness of the sheet, low cost, and thermal expansion. One suitable glass sheet is manufactured by Glaverbel-Mecaniver, S.A. of Brussels, Belgium. The thickness of the glass plates can be, for example, between about 0.02 and 0.04 inches for the diaphragm 12 and about 0.04 to 0.06 inches for the base 14. This particular glass has a flatness of at least 0.0001 inches per inch and has a thermal expansion coefficient of about $85 \times 10^{-7}/°C$. The glass plates 12, 14 can be squares about 1 to 2 inches on a side with electrodes between about 0.25 and 1.0 inches in diameter. The size of the electrode and the size of the glass plate to accommodate that electrode is a matter of choice and is selected based on the desired value of absolute capacitance. The electrodes can be applied, for example, by screen printing in a desired pattern, by evaporating a conductive layer and then patterning, or the like. More specifically, a layer of indium oxide/tin oxide can be evaporated on the glass plates to a thickness of about 500–600 angstroms. This thin film can then be patterned using photolithographic techniques and etching in dilute hydrochloric acid.

The composition of the sealing glass ring 16 must be suitable for forming a hermetic seal which maintains the reference pressure. The sealing glass ring can be applied to the base substrate 14 by a silk screen process in a perimeter seal pattern. This seal is shown to be circular in FIG. 1, but can be of any suitable shape. The sealing can be accomplished by heating the substrate for about an hour in the temperature range of 350° C. to 400° C. to burn off the binder. The base substrate is then heated in vacuum until the sealing ring glass "glazes", that is, it has formed an enamel on the base glass substrate. The diaphragm and base substrate can then be sealed together by spacing apart the two pieces of glass, placing them in an enclosure evacuated to the desired reference pressure, and then reheating to a temperature sufficient to cause the sealing glass to flow. The sealing glass must form a vitreous seal, must be compatible with the glass plates used, and must maintain a hermetic seal even under the vacuum sealing condition. Typical sealing glass mixtures out gas during the vacuum sealing and become filled with numerous bubbles which result in a lack of hermeticity. The out gassing difficulties encountered with typical sealing glasses are attributed to dissolved gases in the glass that are released whenever the glass is subjected to a vacuum while hot enough to flow for sealing. A suitable glass for sealing which overcomes these difficulties can be prepared by vacuum fining a specific glass mixture as described hereinbelow.

A sealing glass mixture which is suitable for the present sealing requirements is a lead silica borate glass which is modified as follows: zinc oxide is substituted for a portion of the lead oxide to reduce expansion, but excessive zinc oxide is avoided as it reduces resistance to devitrification. Lead fluoride ($PbF_2$) is substituted for a portion of the lead oxide to soften the glass. By keeping the $PbF_2$ content under about 10 percent, only a slight unwanted increase in expansion is noted. Cadmium oxide is also substituted for lead oxide as it has been found to both soften the glass and to improve the resistance to devitrification with only a slight resultant rise in the coefficient of thermal expansion. Such a glass mixture can have a composition range as shown in Table I.

TABLE I

| | |
|---|---|
| $SiO_2$ | 8–10 |
| $Al_2O_3$ | 1–2 |
| PbO | 55–60 |
| $PbF_2$ | 7–9 |
| ZnO | 7–10 |
| CdO | 4–6 |
| $B_2O_3$ | 10–15 |

Preferably the sealing glass mixture will have the composition as shown in Table II.

TABLE II

| | | |
|---|---|---|
| $SiO_2$ | 8.8 | wt. % |
| $Al_2O_3$ | 1.2 | |
| PbO | 57.00 | |
| $PbF_2$ | 8.00 | |
| ZnO | 8.00 | |
| CdO | 5.00 | |
| $B_2O_3$ | 12.00 | |

TABLE II-continued

| |
|---|
| 100.00 |

The preferred glass mixture has the following characteristics:

| | |
|---|---|
| Glazing Temperature in vacuum | 500° C. for 30 minutes |
| Sealing Temperature in vacuum | 500° C. for 30 minutes |
| Specific Gravity | 5.63 |
| Thermal expansion Coefficient | $84 \times 10^{-7}$ /° C. (ave. 25°–300° C.) |

Table III shows the batch materials and quantities used for making 1 kilogram of the sealing glass mixture.

TABLE III

| | |
|---|---|
| Hammond Lead Monosilicate (85% PbO and 15% $SiO_2$) | 588.2 |
| Hammond 150Y Litharge (PbO) | 20.0 |
| Hammond 75% Red Lead (75% $Pb_3O_4$ and balance PbO) | 50.9 |
| Hydrated Alumina - Al(OH)$_3$ | 18.1 |
| Lead Fluoride - $PbF_2$ | 80.0 |
| Zinc Oxide - ZnO | 80.0 |
| Cadmium Oxide - CdO | 50.0 |
| Boric Acid - $H_3BO_3$ | 213.1 |

After mixing the batch materials of Table III in a blender, they are melted in a platinum crucible 3 inches in diameter and 3 inches deep. The platinum crucible filled with batch material is loaded into an electric furnace heated to 950° C. After the batch is melted, the molten glass is stirred with a platinum-20 percent rhodium propeller shaped stirrer at about 80 rpm for at least an hour to obtain a homogeneous glass. The melt is then fritted by pouring it into water in a stainless steel container. The frit is then oven dried at 100° C. For the vacuum fining operation a closed end alumina tube is installed vertically in a second electric furnace heated to about 800° C. A portion of the frit as prepared above is loaded into a platinum crucible, placed in the melting furnace, and heated to a temperature of 900° C. After 1 hour the furnace temperature is reduced to 800° C. After one-half hour at 800° C. the crucible is transferred to the bottom of the alumina tube in the second 800° C. furnace. The alumina tube with the crucible of glass material is evacuated with a mechanical vacuum pump for two hours. After two hours the molten glass is again fritted by pouring the melt into water in a stainless steel container. This frit is also oven dried at 100° C. In an alternate method, the fining operation can be combined with a single fritting. The first melt is then transferred to the vacuum furnace, as above, and the glass is fritted only after the vacuum fining.

The glass mixture which has been vacuum fined is ball-milled for about six hours in a ball-mill which is 45 percent full of one-half inch cylindrical Burundum grinding media. That portion of the ground glass which passes through a 400 mesh sieve is mixed into a paste for screen printing. The paste is prepared by mixing the ground glass with a binder and an organic solvent.

The assembly of a pressure sensor device 10 can be accomplished in the following manner. The glass substrate 14 and diaphragm 12 having conductive electrodes 20, 18 disposed thereon are scribed to the desired size. One corner is then cut from each of the glass plates to expose the electrode connection on the opposite plate. The parts are washed in deionized water followed by an alcohol rinse. Sealing glass, made in accordance with the above description, is then screen printed on the base glass in the pattern of the perimeter seal 16. After drying at 100° C. in air, the base glass is loaded into a vacuum furnace and heated to 400° C. for one hour in air to remove the binder. The furnace is then evacuated and the temperature is raised to 500° C. for thirty minutes. The base is then allowed to cool to 350° C. while still in the vacuum. The glazed base is then removed from the vacuum furnace. Four small pieces of shim stock (about 20 mils on a side) of the desired capacitor gap thickness are then placed on each corner of the base. The diaphragm is then placed on the shim stock with the thickness of the shim stock determining the spacing between the base and the diaphragm. The thickness if preferably within the range of about 0.5 and 2.0 mils. This assembly with a 75 gram weight on top is then loaded into a vacuum furnace and evacuated to a pressure of about 100 mm Hg. The furnace is heated to 500° C. for thirty minutes during which time the sealing glass mixture flows and seals together the base and diaphragm. The temperature is then reduced to 250° C. while maintaining the vacuum. The parts are then removed from the furnace.

Figure 2:
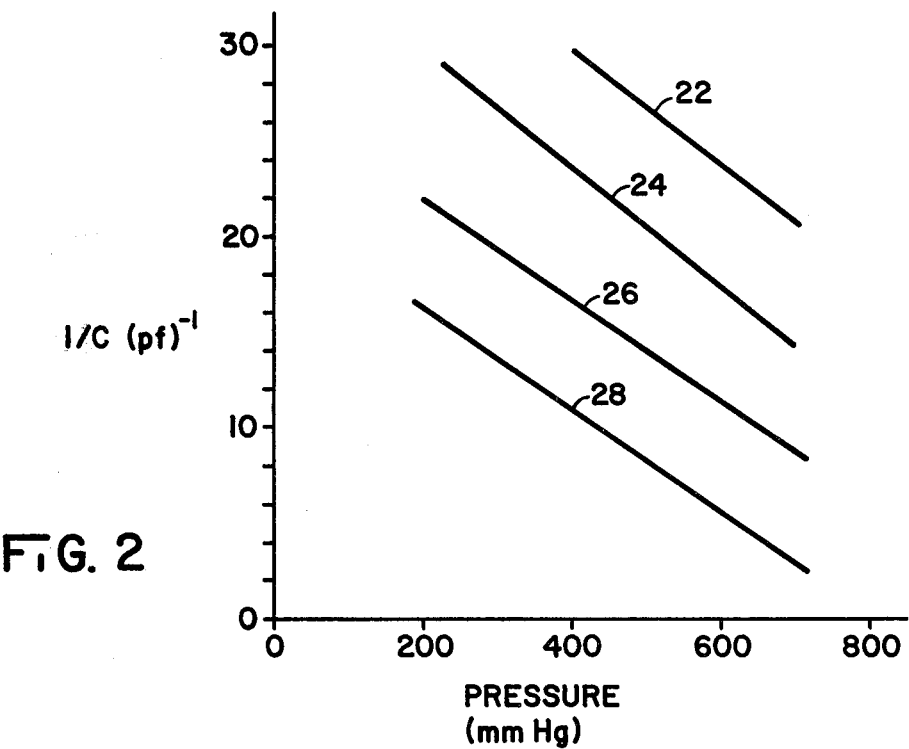
FIG. 2 shows the resultant capacitance change as a function of pressure.

A number of pressure sensor devices were fabricated in this manner. The devices were then placed in a vacuum box that had been modified to permit electrical connection to the capacitor electrodes. Capacitance is measured as a function of pressure within the vacuum box from about 200 mm (Hg) to atmospheric pressure. For each of these devices the base is 0.06 inches thick, the diaphragm is 0.0365 inches thick, and the spacing between diaphragm and base is about 0.001 inches. The seal ring has an inner diameter of about 1.3 inches and the electrode diameter is about 0.5 inches. The results of the measurement are plotted in FIG. 2 showing that reciprocal capacitance is linear with the pressure. Each of the plots 22, 24, 26, 28 represent a different sensor device with differences in the device resulting from differences in electrode size or spacing.

Thus it is apparent that there has been provided, in accordance with the invention, a capacitive pressure sensor made from inexpensive components, requiring only a single sealing operation, and having a high sensitivity over a wide range of pressures. While the invention has been described in conjunction with specific embodiments, it is evident that many alternatives and modifications will be apparent to those skilled in the art in light of the foregoing description. Accordingly, it is intended to embrace all such alternatives and modification as fall within the spirit and scope of the following claims.

What is claimed is:

1. A method for fabricating a pressure sensor comprising vacuum fining a sealing glass mixture; providing two substantially flat glass plates having conductive electrodes thereon, at least one of said glass plates being flexible to render it capable of deforming in response to a change in pressure; applying said sealing glass mixture to one of said glass plates in the shape of a perimeter seal; positioning said plates with a space between said electrodes; evacuating the space between said electrodes to a reference pressure; heating said glass plates and said sealing glass mixture to a temperature to cause said mixture to flow and to seal together said plates.

2. The method of claim 1 wherein said plates are spaced apart by about 0.5 to 2.0 mils.

3. The method of claim 1 wherein said space is evacuated to a substantial vacuum.

4. A method for fabricating a capacitive pressure sensor which comprises providing glass plates each having a substantially flat surface and having a conductive electrode disposed thereon; applying a sealing glass mixture to one of said plates, said mixture having, in weight percent, 8–10 $SiO_2$, 1–2 $Al_2O_3$, 55–65 PbO, 6–10 $PbF_2$, 7–11 ZnO, 4–6 CdO, and 10–14 $B_2O_3$; positioning said glass plates to place said conductive electrodes in a substantially parallel relationship having a space therebetween; evacuating said space to a reference pressure; heating said glass plates and said mixture to about 500°–550° C. to cause said mixture to flow and seal said glass plates together, said glass plates and said mixture bounding a volume at said reference pressure.

5. The method of claim 4 further comprising the step of vacuum fining said sealing glass mixture.

6. A capacitive sensor for measuring ambient pressure comprising: two glass pieces, at least one of said glass pieces being capable of flexing in response to a change in pressure, each having a substantially plane surface with conductive electrodes thereon, said glass pieces being positioned to place said conductive electrodes in a spaced apart, substantially parallel relationship; a sealing glass mixture disposed on one of said pieces to seal together said glass pieces, said mixture and said glass pieces acting together to bound a volume having a reference pressure therein whereby changes in ambient pressure cause a change in the capacitance measured between said conductive electrodes.

7. The capacitive sensor of claim 6 wherein said conductive electrodes are patterned films of indium oxide/tin oxide.

8. The capacitive sensor of claim 6 wherein said two glass pieces comprise a substantially rigid base piece and a thinner, flexible diaphragm piece.

9. A capacitive sensor for measuring ambient pressure comprising: two glass pieces, each having a substantially plane surface with conductive electrodes thereon, said glass pieces being positioned to place said conductive electrodes in a spaced apart, substantially parallel relationship; a sealing glass mixture disposed on one of said pieces to seal together said glass pieces, said mixture having, in weight percent, about 8–10 $SiO_2$, 1–2 $Al_2O_3$, 55–60 PbO, 7–9 $PbF_2$, 7–10 ZnO, 4–6 CdO, and 10–15 $B_2O_3$ said mixture and said glass pieces acting together to bound a volume having a reference pressure therein whereby changes in ambient pressure cause a change in the capacitance measured between said conductive electrodes.

10. The capacitive sensor of claim 9 wherein said sealing glass mixture has, in weight percent, about 8.8 $SiO_2$, 1.2 $Al_2O_3$, 57 PbO, 8 $PbF_2$, 8 ZnO, 5 CdO, and 12 $B_2O_3$.

11. The capacitive sensor of claim 6 wherein said reference pressure is a substantial vacuum.

12. The capacitive sensor of claim 6 wherein said reference pressure is less than about 100 mm Hg.

13. A method for fabricating a capacitive pressure sensor comprising the steps of: providing two glass plates, at least one of said glass plates being flexible enough to be capable of responding to a change in pressure, and each having a substantially plane surface; providing conductive electrodes on said substantially plane surfaces; applying a sealing glass material to at least one of said two glass plates; positioning said two glass plates to place said conductive electrodes in a substantially parallel relationship having a space therebetween; evacuating the space between said spaced apart electrodes; heating said glass plates to cause said sealing glass material to flow and to seal said glass plates together, said glass plates and said sealing glass material bounding an evacuated volume.

* * * * *

Disclaimer 4,184,189.—*Earl K. Davis*, Tempe; *Kent W. Hansen*, Scottsdale; *Scot W. Taylor*, Tempe and *Robert M. Wentworth*, Phoenix, Ariz. CAPACITIVE PRESSURE SENSOR AND METHOD OF MAKING IT. Patent dated Jan. 15, 1980. Disclaimer filed June 22, 1983, by the assignee, *Motorola, Inc.*

Hereby enters this disclaimer to claims 6, 8, 11 and 13 of said patent.

[*Official Gazette August 2, 1983.*]